A. A. BARNES.
WAGON BRAKE.
APPLICATION FILED APR. 24, 1911.
998,829.
Patented July 25, 1911.
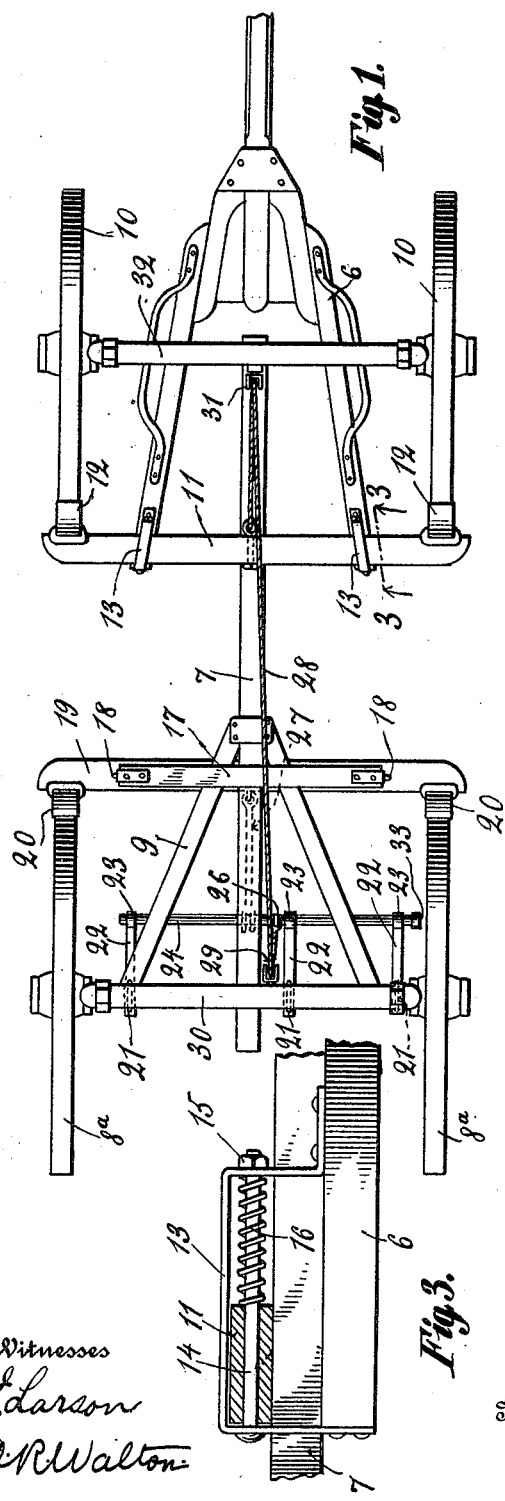
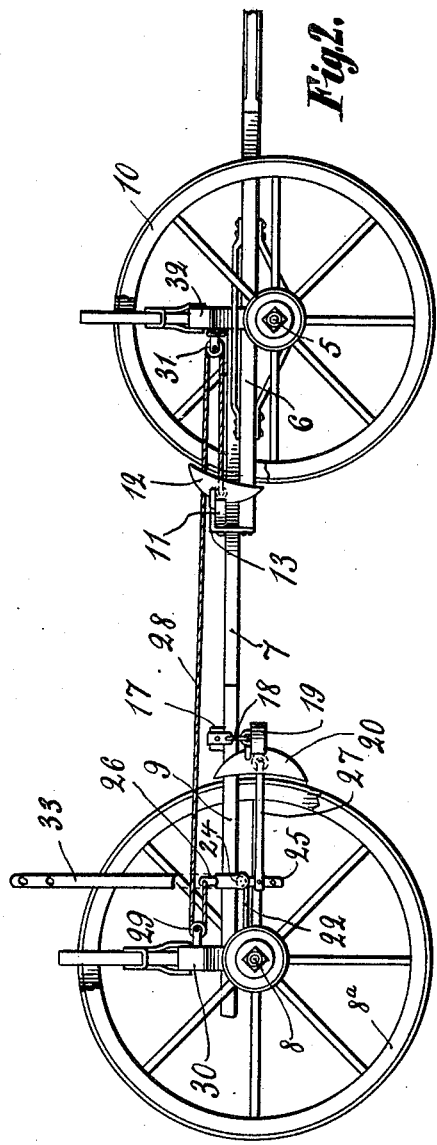
Witnesses
E. Larson
O. R. Walton
Inventor
Albert A. Barnes
By Max A. Schmidt
Attorney

UNITED STATES PATENT OFFICE.

ALBERT A. BARNES, OF VANCOUVER, WASHINGTON.

WAGON-BRAKE.

998,829. Specification of Letters Patent. Patented July 25, 1911.

Application filed April 24, 1911. Serial No. 622,965.

*To all whom it may concern:*

Be it known that I, ALBERT A. BARNES, a citizen of the United States, residing at Vancouver, in the county of Clarke and State of Washington, have invented certain new and useful Improvements in Wagon-Brakes, of which the following is a specification.

This invention relates to that class of wagon brakes in which a brake shoe is provided for each wheel, and it is the object of the invention to provide a brake mechanism of this kind which is simple in construction, and highly efficient in operation, and also to provide improved means for setting the brakes, a single actuating lever being provided by means of which all the brakes may be set simultaneously.

The invention also has for its object to provide a brake mechanism embodying certain novel structural details to be hereinafter described and claimed.

In the accompanying drawing—Figure 1 is a plan view of the running gear of a wagon showing the application of the invention; Fig. 2 is a side elevation thereof, and Fig. 3 is a section on the line 3—3 of Fig. 1.

Referring specifically to the drawing, the front axle 5, the front hounds 6, the reach 7, the hind axle 8, and the hind hounds 9 may be of any approved construction.

Behind the front wheels 10 of the wagon is located a brake beam 11 equipped with brake shoes 12 to engage said wheels. This brake beam is slidably supported on top of the reach 7 and works at its ends under straps 13 secured to the front hound 6. The straps have upstanding portions at their front and rear ends between which the beam is located, and through which bolts 14 pass, said bolts being secured by nuts 15. The bolts also pass loosely through the brake beam, and between the latter and the front upstanding portion of the straps are located springs 16, which latter are coiled around the bolts. The brake beam is guided by the bolts, and when it moves forwardly to set the brake shoes, the springs are compressed. When the brake beam is released, the springs expand and move the beam rearwardly to release the brake shoes.

The hind hounds 9 support a cross bar 17 from which is suspended, by means of links 18, the brake beam 19 for the hind wheels 8ª, said beam being equipped with shoes 20 at its ends to engage said wheels.

The following means are provided for operating the brakes: To the hind axle 8 are secured by clips 21, forwardly extending horizontal arms 22 having bearings 23 at their extremities in which is supported a transverse rock shaft 24 located behind the brake beam 19. The rock shaft has two oppositely extending arms 25 and 26, respectively, the former extending downwardly, and the latter upwardly. The arm 25 is connected by a forwardly extending rod 27 to the brake beam 19. To the arm 26 is made fast one end of a cable or rope 28, the other end of which is made fast to the front brake beam 11. The cable passes rearwardly from the arm 26 to a pulley 29 mounted on the rear bolster 30, and after passing over said pulley it extends forwardly to a swiveled pulley 31 carried by the front bolster 32, over which it passes and then extends rearwardly to the beam 11 to which it is fastened.

One end of the rock shaft 24 has a lever extension 33 whereby said shaft is operated.

The brakes are applied by swinging the lever 33 forwardly whereby the shaft 24 is rocked and through the rod 27 and the cable 28 both brake beams are actuated and all the brake shoes are set. When the lever is released, the springs 16 release the brake shoes.

It will be seen from the foregoing that a brake mechanism is provided which is extremely simple in construction, and which is capable of application to any ordinary wagon.

The brakes can also be easily applied, and there is nothing to interfere with the turning of the wagon.

I claim:

The combination with a wagon running gear; of a brake mechanism comprising brake beams for the front and hind wheels, a transverse rock shaft carried by the running gear behind the rear brake beam, and having oppositely extending arms, a connection between one of the arms and the rear brake beam, a pulley mounted on the rear portion of the running gear, a swiveled pulley carried by the front portion of the running gear in front of the front brake beam, a line connected to the other arm of the rock shaft and extending rearwardly therefrom to the first-mentioned pulley, and thence over the same and forwardly to the second-mentioned pulley, and thence over the same and rearwardly to the front brake beam and fastened thereto, and means for operating the rock shaft.

In testimony whereof I affix my signature in presence of two witnesses.

ALBERT A. BARNES.

Witnesses:
G. R. PERCIVAL,
DAVID TALBOT.

Copies of this patent may be obtained for five cents each, by addressing the "Commissioner of Patents, Washington, D. C."